TAPE DRIVE AND BRAKE MECHANISM FOR A MAGNETIC TAPE RECORDER

Filed March 1, 1966 Sheet 1 of 3

INVENTOR

KATSUYA ATSUMI

INVENTOR
KATSUYA ATSUMI

INVENTOR.
KATSUYA ATSUMI

United States Patent Office 3,448,940
Patented June 10, 1969

3,448,940

TAPE DRIVE AND BRAKE MECHANISM FOR A MAGNETIC TAPE RECORDER

Katsuya Atsumi, Tokyo, Japan, assignor to Akai Electric Company Limited, Tokyo, Japan Filed Mar. 1, 1966, Ser. No. 530,888
Claims priority, application Japan, Mar. 3, 1965, 40/12,059
Int. Cl. G11b *15/44*
U.S. Cl. 242—55.12 1 Claim

ABSTRACT OF THE DISCLOSURE

A tape drive and brake mechanism for magnetic tape recorders having a pair of motorized tape reels for alternately feeding and winding tape. A pair of braking rollers are mounted in proximity of the reels and are spring biased into contact therewith. A system of linkages extending between the braking rollers and a plurality of control buttons is arranged so that the braking roller associated with the reel which is feeding tape is applied to that reel before the braking roller associated with the reel which is winding tape is applied. In releasing the braking rollers, that braking roller which is associated with the reel which is winding tape is released before the braking roller associated with the reel which is feeding tape.

This present invention relates to improvements in and relating to tape drive and brake mechanisms of magnetic tape recording and reproducing machines, hereinafter briefly referred to "tape recorder."

Conventional brake mechanisms of the kind referred to above have been so designed and arranged that the brake arms at the tape feed and tape wind-up sides of the tape reeling mechanism are applied simultaneously to the tape feed reel (or its related friction clutch element) and the tape wind-up reel (or its related friction clutch element), when it is desired to operate the brake mechanism, for instance, for stopping the tape reeling mechanism so as to terminate a playback, recording, fast forward feed or fast rewinding service of the tape recorder. In the similar way, the release of the both brake arms from the respective tape reels or related friction clutch elements is carried into effect simultaneously with practically no time lag relative to each other.

In practical view point, however, it has been found that with use of the tape recorder for an extended time period, considerable wears will be invited on the relatively slidable and frictional elements such as brake shoes which may be of stationary design or of frictionally rotatable design. Similar wears may occur in the hinge connections normally found in the mechanical brake system. This results in a disturbance in the scheduled simultaneous timing of the operation of the both brake elements. A considerable difficulty will be further invited by the variation in the reel loads at the both sides of the tape reeling mechanism which variation is caused to take place in the course of an extended operating service of the tape recorder for playback, recording or the like, wherein the volume of the tape spool on either reel will gradually be increased or decreased, as the case may be.

A still further difficulty in attaining an optimum operation of the brake system will be invited by the considerable difference in the tape running speed as met between the regular recording or reproducing services, on the one hand, and the fast forward winding or rewinding service with the tape recorder. For increasing the amount of recorded information of a certain length of the magnetic tape, the regular speed thereof in the above-mentioned sense is selected to be a lowest possible value without influencing adverse effects upon the tone or image quality when reproduced. On the other hand, the fast tape speed as employed in the latest-mentioned services is designed to be a highest possible value for minimizing the idle time to a possible minimum. When the properly designed operative condition of the brake system should be injured by a certain or other cause, a breakage, or elongation or conversely at least a considerable slackening of the tape will be caused to take place, especially at the commencement or termination of the fast tape winding service in either tape running direction. If this kind of phenomenon should occur, the quality of the reproduced information will be highly injured from the scheduled one.

It is therefore the main object of the present invention to provide a highly improved tape drive and brake mechanisms of the above kind, capable of obviating the aforementioned various drawbacks inherent in the prior art.

Another object of the invention is to provide the mechanism of the kind above referred to, capable of working always at an optimum operation thereof, for effectively avoiding otherwise possible tape breakage, slackening, elongation and the like when the brake is applied, yet keeping the tape in its optimum tightened condition.

These and other objects of the invention will be more apparent to those skilled in the art from a consideration of the following detailed description when taken together with the accompanying drawings, illustrative of a preferred embodiment of the invention in no limiting sense.

Figure 1:
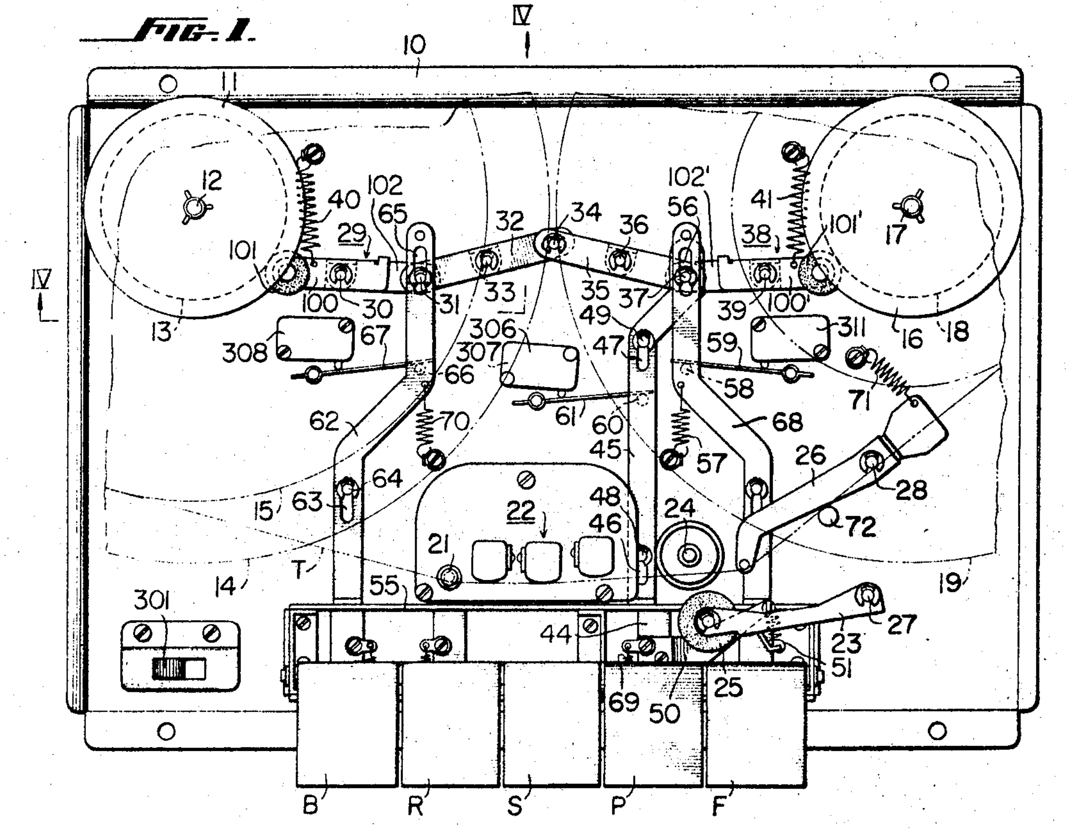
FIG. 1 is a schematic top plan view of a tape recorder fitted with a tape drive control and brake mechanism according to this invention shown in its non-operating condition.

Now referring to the accompanying drawings, 10 denotes a chassis panel of a tape recorder which is fitted with the tape drive control arrangement according to this invention. A plurality of tape drive control buttons F, P, S, R and B are mounted pivotably on the panel 10 substantially along the lower edge thereof when seen in FIGS. 1 and 2.

Button F serves for fast forward drive of the magnetic tape shown only schematically by a chain-dotted line T, button P for playing or reproducing service; button S for stop control; button R for recording and button B for rewinding service, respectively, as will be described more fully hereinafter.

Numeral 11 denotes a tape feed turn disc fixedly attached with its shaft 12 which passes rotatably through the panel 10 and driven from a direct-coupled motor M2 (FIGS. 4 and 7) through the intermediary of a pair of friction clutch members 13$a$ and 13$b$ constituting in combination a clutch assembly 13. The upper member 13$a$ is made integral with the disc 11, while the lower element 13$b$ is made integral with the shaft, not shown, of the motor M2. As conventionally, the turn disc 11 mounts frictionally a tape reel 14, having a spool as at 15 of the tape T.

Figure 4:
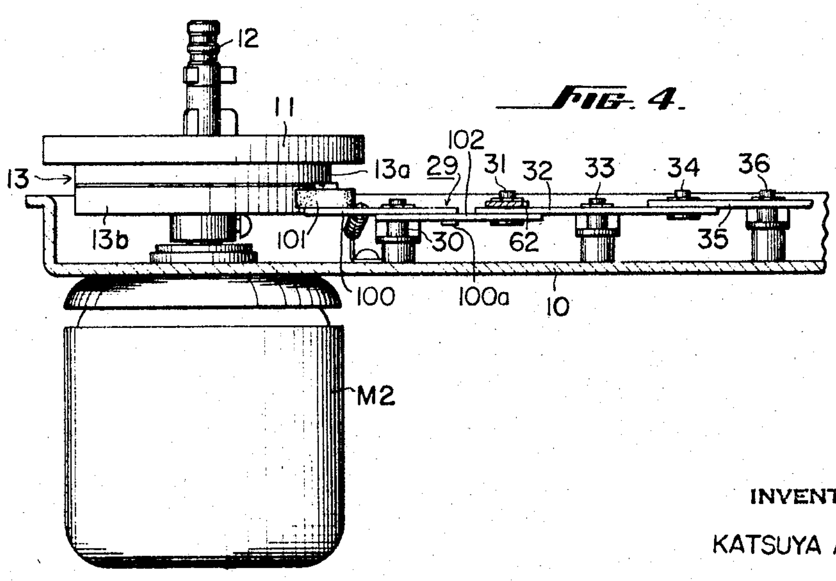
FIG. 4 is a partial sectional view of the arrangement of FIG. 1, taken on a line IV—IV shown therein.

Similarly, 16 denotes a tape wind-up turn disc fixedly attached with its shaft 17 which passes again rotatably through the panel and driven from a direct-coupled motor M3 (FIG. 7) through the intermediary of a friction clutch 18, the construction and arrangement of which are perfectly similar to those described hereinbefore substantially with reference to FIG. 4 and thus a detailed illustration of the clutch may be dispensed with. The turn disc 16 mounts frictionally a tape reel 19, having a spool as at 20 of the tape T which has been threaded from spool 15 through guide post 21; magnetic head group 22; capstan 24 adapted for cooperation with pressure roll 25 mounted on arm 23 which is pivotable at 27 and tension arm 26 pivotably mounted at 28 to the reel 19. The capstan 24 passes rotatably through the panel 10 and directly coupled with a main drive motor M1 which is shown only in FIG. 2 and schematically.

Foldable brake arm 29 is pivotable at 30 and arranged so as to cooperate with the peripheral surface of the lower element 13$b$ of first friction clutch 13 and linked by means of a connecting pin 31 to a link member 32 at its one end, said link member being pivotable around pin 33 and linked in turn at its one end to second link member 35 through a pin-and-groove connection at 34. The link member 35 is pivotably mounted at 36 and linked by means of a connecting pin 37 to a second foldable brake arm 38 which is mounted in turn pivotably about a pin 39. Tension springs 40 and 41 are provided for brake arms 29 and 38 so as to resiliently urge the latter for contact with the clutch elements of the clutches 13 and 18, respectively.

Figures 5, 6, 7:
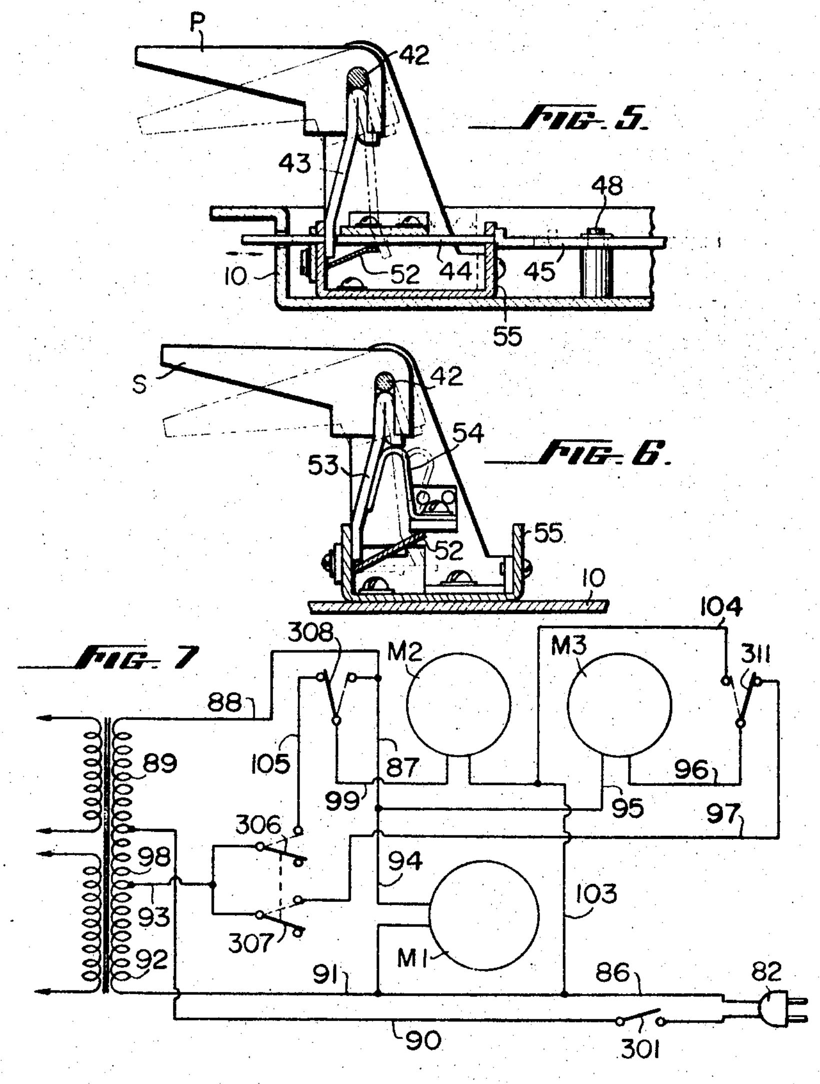
FIGS. 5 and 6 are side views, partially sectioned, of a play control and a stop control button with related parts, respectively.
FIG. 7 is a wiring diagram of an electric circuit including three tape drive motors employed.

As shown in FIG. 5, play control button P is pivotable about an elongated support bar 42 which is arranged in common to all the push buttons, although not shown. Button P is provided with a depending stem 43 which is mechanically coupled with a slide 44 capable of shifting in a horizontal plane as hinted by a double-headed small arrow shown in FIG. 5 and rigidly connected with an operating bar 45 at its one end. For guiding the movement of this bar, the latter is formed with an elongated slots 46 and 47 receiving slidable guide pins 48 and 49 (FIGS. 1 and 2), respectively, which are studded on the panel 10. The opposite end of the bar 45 is linked through an elongated slot 56 to the connecting pin 37 for cooperation therewith.

A depending pin 60 is fixedly mounted on the bar 45 for change-over control of a micro switch of duplicate type 306–7 through the intermediary of a pivotable spring plate 61, these switch elements 306 and 307 being also illustrated in the circuit shown in FIG. 7.

Slide 44 is attached fixedly with a lateral arm 50 and a spring 51 is tensioned between the arm 50 and the pressure roller arm 23.

Figure 2:
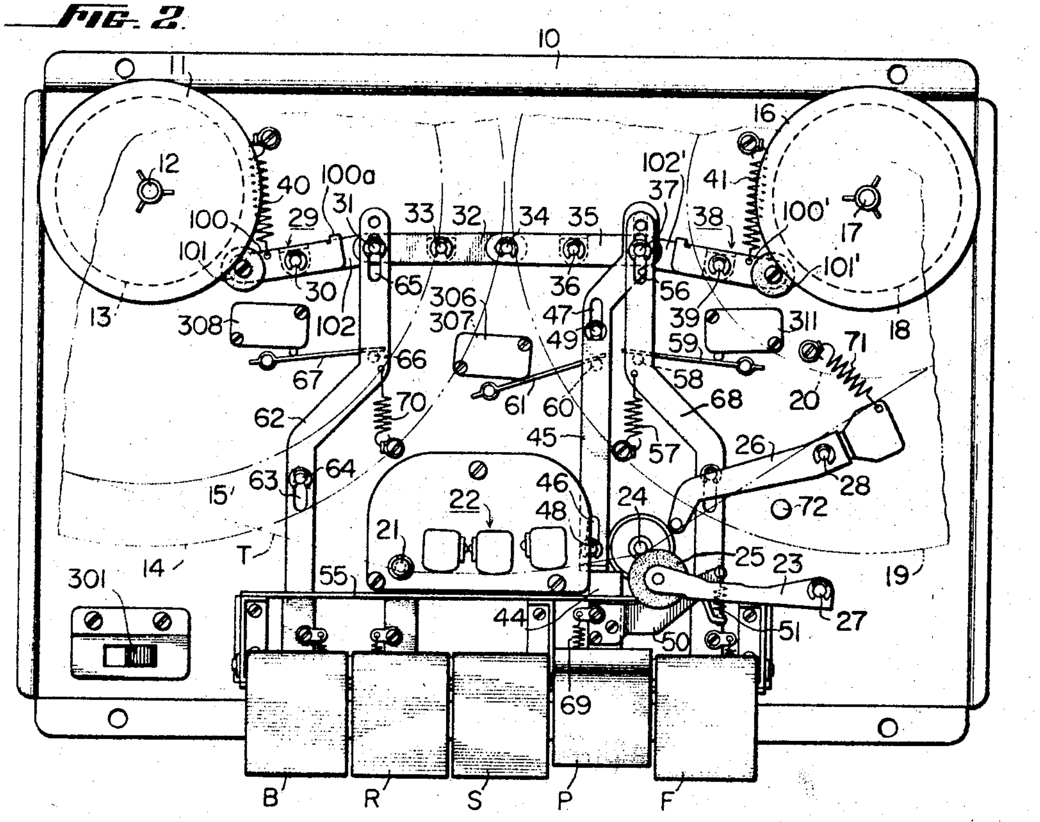
FIG. 2 is a similar view to FIG. 1, illustrating an operating condition of the tape recorder.

When the play control button P is depressed as shown by corresponding chain-dotted line, the slide 44 and its lateral arm 50 are advanced from left to right in FIG. 5, causing thereby the pressure roller arm 23 to turn clockwise in FIG. 1 so that the pressure roller is brought into engagement with capstan 24, as clearly seen in FIG. 2.

In the normal operating condition wherein the tape T is threaded in the aforementioned way and as clearly shown in FIG. 1, an elongated lock bar 52 (see, FIGS. 5 and 6 in common) is turned clockwise against spring action, not shown, in the course of the depressing manipulation of the button P. The latter is then kept in its locked condition by the abutting engagement with the forward edge of the sprung-back bar 52. This locked position of the button P is clearly shown in FIG. 5 by chain-dotted lines.

Stop button S is also formed with a depending leg 53 and resiliently urged by a spring 54 against a side wall of an elongated small frame 55 having a channel-shaped cross-section as shown in FIGS. 1, 2, 5 and 6 and fixedly mounted on the panel 10. This button serves, when depressed, for swiveling the lock bar 52 clockwise in FIG. 6 so as to release any one or more locked push buttons, if any. When the depressing finger pressure is released, stop button S will automatically return to its resting position under the influence of return spring 54.

Fast forward drive control button F has substantially similar construction in its principle with that of the button P, except the related parts thereof for cooperating with the pressure roller arm 23. An operating bar 68 is linked at its rear end to the button F and formed at its front end with an elongated slot 56 which receives slidably the aforementioned pin 37.

A pin 58 is fixedly attached to the operating bar 68 for the control of a microswitch 311 through the intermediary of a pivotable spring plate 59 for energizing or de-energizing the tape winding motor M3, FIG. 7.

Record control button R is provided with a similar integral stem and a mechanically coupled slide therewith, to those denoted by 43 and 44 in the foregoing, but not with any operating bar linked with the brake mechanism proper. This button serves for switching amplifiers and the like electronic components, not shown, of the tape recorder, and a recording operation can be initiated by depressing both buttons P and R, simultaneously.

Rewinding control button B is rigidly connected with operating bar 62 having an elongated slot 63 which receives slidably a guide pin 64 studded on panel 10. The forward end of the bar 62 is also formed with a slot 65 kept in slidable engagement with pin 31 for establishing link connection with the brake system.

Operating bar 62 mounts fixedly a pin 66 serving for the control of a microswitch 308 through the intermediary of pivotable spring plate 67, said switch 308 being provided for initiating and stopping the operation of tape feed motor M2 as shown in FIG. 7.

Return springs 57, 69 and 70 are provided for operating arms 68, 45 and 62, respectively. Tension arm 26 is provided with a spring 71 for resiliently urging the arm against a stationary stop 72. A main switch 301 is mounted on the left-hand lower corner of the panel 10 in FIGS. 1 and 2 and inserted in the circuit shown in FIG. 7 so as to manually on-off control of the circuit which is adapted to be connected through the intermediary of a plug 82 to an A.C. current source, not shown.

Figure 3:
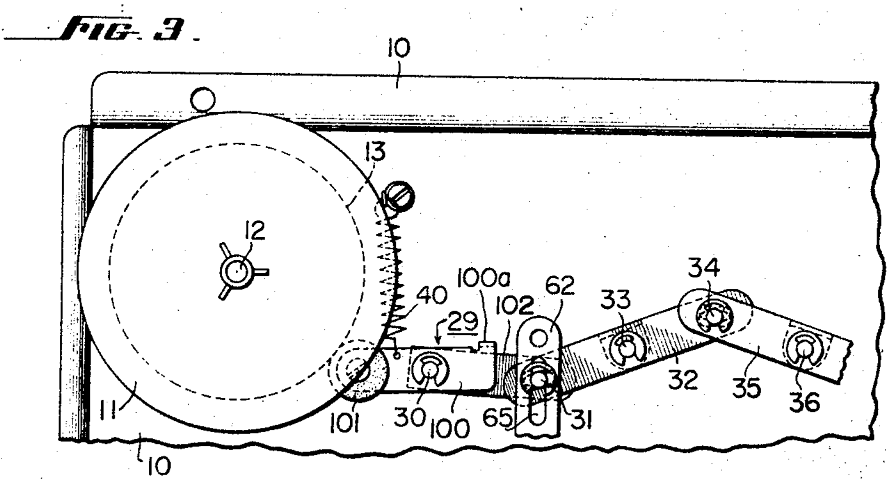
FIG. 3 is an enlarged partial view of FIG. 2.

The construction of the foldable brake arm 29 is specifically shown in FIG. 3. This arm comprises in practice an arm proper 100 carrying at its free end a frictionally rotatable rubber roll acting as brake shoe, on the one hand, and a supporting strip 102, on the other hand, said arm proper 100 and said strip 102 being pivotable to each other around the pivot pin 30. The arm proper 100 is formed with a depending stop 100$a$ engageable with the related side edge of the supporting strip 102. It will be noted that this construction assures a practically non-limitative swivel movement of the arm proper 100 relative to the strip 102 in the direction to oppose the urging force provided by the urging spring 40, while the opposite turning movement of the arm proper relative to the strip is limited to a certain range by the engagement of the stop 100$a$ with the strip 102.

Similar construction is employed for the another brake arm 38. The corresponding parts are denoted by the same reference numerals attached each with a prime as shown so that the construction as well as the mode of operation of this brake arm 38 will be easily understood without further detailed anlaysis.

The operation of the above-mentioned machine is as follows:

When it is desired to operate the tape recorder, plug 82 is connected to an A.C. power source and main switch 301 is manually closed. Currents will therefore from plug 82 through conductor 86, main motor M1, conductors 87 and 88, winding 89, and conductor 90 and now closed switch 301 back to plug 82, thus the motor M1 is energized and the capstan 24 is kept in rotation at a predetermined speed and in the counter-clockwise direction in FIG. 1.

Next, tape feed reel 14 and tape wind-up reel 19 are placed on the turn discs 11 and 16, respectively, and the tape end drawn out from the wound tape spool 15 is threaded as in the aforementioned way to the wind-up reel. In this case, however, the tape T is generally in its loosened state so that the tension arm 26 is resiliently kept in engagement with a stop pin 72 studded on the panel under the influence of resilient force exerted by urging spring 71.

Now assuming that the play button P is depressed so as to initiate a play-back operation of the machine, operating lever 45 is advanced in the upward direction when seen in FIG. 1, thereby the connecting pin 37 being moved upwardly for turning, at first, brake arm 38 against spring action 41 in the releasing or clockwise direction in the same figure. In this case, the arm proper 100' and support strip 102' will move in unison as already described hereinbefore. This releasing operation is transmitted through connecting links 35 and 32 to another brake arm 29 which is thus caused to turn against spring action 40 in its releasing direction with a short time lag in comparison with the release of the first brake arm 38.

In this case, also, the arm proper 100 and support strip 102 will move in unison. Thus, the both reel shafts 12 and 17 are kept in their freely rotatable condition.

With advance of slide 44 caused by the said manual depression of play button P, arm 23 is rotated clockwise in FIG. 1 so as to bring pressure roller 25 in pressure contact with now rotating capstan 24 with the tape T kept pinched therebetween, thereby the tape being fed in its forward drive direction at a predetermined relatively low running speed.

At the same time, the pin 60 on the operating bar 45 will act through spring plate 61 upon the double switch 306–7 so as to close from their off-position to "on."

Thus, currents will flow through conductors 94, 95 to wind-up motor M3, thence through conductor 96, switch 311, conductor 97, now closed switch 307, conductor 93, winding element 98, conductor 90 and main switch 301 back to plug 82. Therefore, the motor M3 is energized for turning in conuter-clockwise direction in FIGS. 1–2, for carrying out the tape winding-up service.

Simultaneously, currents will also flow through conductor 86, 103 to tape feed motor M2 in the reverse turning direction; thence through conductor 99, switch 308, conductor 105, now closed switch 306, conductor 9 and winding element 98 to return conductor 90. For supplying a weak brake current to the motor M2 for providing a slight back tension to the running tape T. This tape tension will cause the tension arm 26 to rotate a small angular distance about its pivot 28, more specifically from its position shown in FIG. 1 to that shown in FIG. 2.

When stop push button S is depressed, the lock bar 52 will be brought from its lockable position to its non-locking position through the intermediary of the stem of the button, thereby the operating bar 45 being caused to return to its initial position under the influence of return spring 69. In this case, the brake system is also shifted from its non-operating position to its applied position shown in FIG. 1. Thanks to the intensional provision of considerable plays in the connecting linkage, the brake arm 29 at the tape feeding side is caused to return initially and then the brake arm 38 at the tape wind-up side will return to its applied position. By this means, disadvantageous slackening of the tape will be positively avoided. Other operational elements such as pressure roller arm 23, switches 306–7 and the like are brought back to their initial position.

When fast forward push button F is depressed so as to advance the operating bar 68, the brake system including arm 29 and 38 is released as in the case of play control button P. In addition, switch 311 is operated through the intermediary of pin 58 and spring plate 59, thereby shifting from full-lined to chain-dotted line position in FIG. 7, thereby a feed circuit including conductors 103 and 104 and switch 311 is established so as to feed more strong current to the take-up motor M3. The pressure roller 25 is kept also in its disengaged position from the cooperating and rotating capstan 24. Therefore, the tape T is wound-up at a predetermined faster speed by the related reel 19.

When rewinding button B is depressed, the operating bar 62 is equally advanced so as to release again the brake system from its applied position.

In addition, switch 308 is caused to shift from its full-lined to its dotted line position so that, as will be easily understood, reverse current will be supplied to motor M2, thereby the tape T being rewound by the related tape reel 14 at a predetermined fast speed and in the reverse direction relative to the forward tape drive direction so far described.

When the tension arm 26 senses either a termination or a considerable slack of the tape regardless of the running direction thereof, the arm 26 is caused to swivel in the counter-clockwise direction when seen in FIG. 1, thereby to actuate an automatic stop not shown.

While the invention has been illustrated and described as embodied in a preferred embodiment, it is not intended to be limited to the specific embodiment shown, since various modifications and structural changes may be made without departing in any way from the spirit of the present invention.

What is claimed as new and desired to be secured by Letters Patent is:

1. A tape drive and brake mechanism for a magnetic tape recorder comprising:

(a) a chassis panel;

(b) a tape reeling mechanism mounted on said panel and having first and second motorized tape reels adapted to alternately feed and wind tape;

(c) a plurality of tape drive control members; and (d) a brake system having:

(1) first and second braking members carried by said panel for selective movement into and out of engagement with said first and second motorized tape reels, respectively, and (2) an operating linkage system arranged to operate with predetermined longitudinal play and including; first and second arms pivotally connected together at one of their ends and rotatably mounted to said panel intermediate their ends, third and fourth arms pivotally connected at one of their ends to the other ends of said first and second arms, respectively, rotatably mounted on said panel intermediate their ends, and carrying said first and second braking members at their opposite ends, spring means biasing said third and fourth arms for rotation in a direction to apply the braking members to said motorized tape reels, said operating linkage including a plurality of operating bars interconnecting said tape drive control members with the points of connection between said first and second arms and said third and fourth arms, respectively, said operating bars having lost motion means therein and being movable in directions to apply and release said brake members, said operating linkage system being effective to first apply the brake member at the reel which is feeding tape and then at the reel which is winding tape and to first release the brake member at the reel which is winding tape and then at the reel which is feeding tape.

References Cited

UNITED STATES PATENTS

| | | | |
|---|---|---|---|
| 2,687,882 | 8/1954 | Pettus | 242—55.12 X |
| 2,920,148 | 1/1960 | Munroe | 242—55.12 X |
| 3,027,109 | 3/1962 | Andrews et al. | 242—55.12 |
| 3,093,335 | 6/1963 | Lane | 242—55.12 |
| 3,137,454 | 6/1964 | Atsumi A | 242—55.12 |
| 3,288,386 | 11/1966 | Gerfast et al. | 242—55.12 |
| 3,305,187 | 2/1967 | Atsumi B | 242—55.12 |
| 2,712,448 | 7/1955 | Schroter | 242—55.12 X |

GEORGE F. MAUTZ, *Primary Examiner.*